(12) United States Patent
Tan

(10) Patent No.: US 10,331,891 B2
(45) Date of Patent: Jun. 25, 2019

(54) BRANCH TARGET COMPUTATION IN SECURE START-UP USING AN INTEGRITY DATUM AND AN ADJUSTMENT DATUM

(75) Inventor: Victor Tan, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1066 days.

(21) Appl. No.: 13/366,721

(22) Filed: Feb. 6, 2012

(65) Prior Publication Data

US 2013/0205124 A1 Aug. 8, 2013

(51) Int. Cl.
*G06F 21/57* (2013.01)
*G06F 9/30* (2018.01)
*G06F 21/51* (2013.01)
*G06F 9/32* (2018.01)
*G06F 21/12* (2013.01)
*G06F 21/50* (2013.01)

(52) U.S. Cl.
CPC .......... *G06F 21/575* (2013.01); *G06F 9/3005* (2013.01); *G06F 9/30054* (2013.01); *G06F 9/30058* (2013.01); *G06F 9/322* (2013.01); *G06F 21/12* (2013.01); *G06F 21/50* (2013.01); *G06F 21/51* (2013.01)

(58) Field of Classification Search
CPC .... G06F 9/30145; G06F 11/3636; G06F 9/30; G06F 11/3648; G06F 9/3005; G06F 21/575; G06F 9/30054; G06F 9/30058; G06F 9/322; G06F 21/12; G06F 21/50; G06F 21/51
USPC .......................... 712/227, 226, 234; 713/1, 2
See application file for complete search history.

(56) References Cited

U.S. PATENT DOCUMENTS

| | | | | |
|---|---|---|---|---|
| 4,860,199 A | * | 8/1989 | Langendorf et al. | 711/213 |
| 5,805,876 A | * | 9/1998 | Bose et al. | 712/234 |
| 5,832,235 A | * | 11/1998 | Wilkes | 709/247 |
| 5,860,017 A | * | 1/1999 | Sharangpani | G06F 9/3804 712/218 |
| 6,256,727 B1 | * | 7/2001 | McDonald | 712/235 |
| 6,304,960 B1 | * | 10/2001 | Yeh et al. | 712/236 |
| 6,678,837 B1 | * | 1/2004 | Quach et al. | 714/38.13 |
| 7,577,992 B2 | * | 8/2009 | Abadi et al. | 726/22 |
| 8,006,078 B2 | * | 8/2011 | Lee et al. | 712/233 |
| 2002/0099951 A1 | * | 7/2002 | O'Connor | G06F 21/126 726/26 |
| 2003/0163678 A1 | * | 8/2003 | Brockmann et al. | 712/239 |

(Continued)

OTHER PUBLICATIONS

IEEE transactions on Computers, vol. 41, No. 12, Dec. 1992, Efficient Instruction Sequencing with Inline Target Insertion by Wen-mei W. Hwu and Pohua P. Chang.*

(Continued)

*Primary Examiner* — Keith E Vicary
(74) *Attorney, Agent, or Firm* — Alleman Hall Creasman & Tuttle LLP

(57) ABSTRACT

Embodiments related to conducting and constructing a secure start-up process are disclosed. One embodiment provides, on a computing device, a method of conducting a secure start-up process. The method comprises recognizing the branch instruction, and, in response, calculating an integrity datum of a data segment. The method further comprises obtaining an adjustment datum, and computing a branch target address based on the integrity datum and the adjustment datum.

20 Claims, 3 Drawing Sheets

(56) References Cited

U.S. PATENT DOCUMENTS

| | | | |
|---|---|---|---|
| 2004/0162989 A1* | 8/2004 | Kirovski ...................... | 713/189 |
| 2005/0257033 A1* | 11/2005 | Elias .................. | G06F 9/30058 |
| | | | 712/236 |
| 2007/0250703 A1* | 10/2007 | Giraud et al. ................ | 713/154 |
| 2008/0052499 A1* | 2/2008 | Koc .............................. | 712/238 |
| 2008/0256346 A1* | 10/2008 | Lee et al. ..................... | 712/239 |
| 2011/0078425 A1* | 3/2011 | Shah et al. ................... | 712/239 |
| 2012/0290817 A1* | 11/2012 | Olson et al. .................. | 712/205 |
| 2013/0160121 A1* | 6/2013 | Yazdani .......................... | 726/23 |
| 2013/0205124 A1* | 8/2013 | Tan ............................. | 712/227 |

OTHER PUBLICATIONS

Hwu, et al., "Efficient Instruction Sequencing with Inline Target Insertion", Retrieved at <<http://www.google.com/url?sa=t&rct=j&q=e%02cient%20instruction%20sequencing%20with%20inline%target%20insertion&source=web&cd=1&ved=0CBoQFjAA&url=http%3A%2F%2Fimpact.crhc.illinois.edu%2Fftp%2Fjournal%2Fieeetc.branch.92.ps&ei=labAToTTEsrh8A0KxtiLCg&usg=AFQjCNFOJfzwD90E-KqsvFwJTIKyVdVlbA>>, IEEE Computer Society Washington, DC, USA, Dec. 1992, pp. 1537-1551.

* cited by examiner

BRANCH TARGET COMPUTATION IN SECURE START-UP USING AN INTEGRITY DATUM AND AN ADJUSTMENT DATUM

BACKGROUND

Upon starting, computing devices typically execute a start-up process before reaching a ready state. A start-up process may include one or more stages, wherein each stage may be configured to initialize one or more components of the computing device. Further, to help prevent malicious code from being executed during start-up, one or more of the stages may include verification steps to ensure that the start-up process has not been modified.

SUMMARY

Embodiments are disclosed that relate to a secure start-up process comprising a computation of a target of a branch instruction. For example, one disclosed embodiment provides, on a computing device, a method of conducting a secure start-up process. The method comprises recognizing the branch instruction, and, in response, calculating an integrity datum of a data segment. The method further comprises obtaining an adjustment datum, and computing a branch target address based on the integrity datum and the adjustment datum.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, computing devices may employ a start-up process comprising a plurality of discrete stages, each configured to perform one or more specific jobs (e.g., initialize one or more components) before transferring control to the following stage. Each stage may include one or more verification steps to ensure that the start-up process has not been modified. Preventing such modifications may be desirable, as said modifications may allow for the execution of unauthorized code and/or access to secure memory locations.

As a more specific example, before jumping from one stage to the next stage, one or more verification steps may be performed on the next stage data to ensure its integrity. The jumping and verification may be accomplished, for example, via a branch instruction. The branch instruction may be configured to compare an integrity datum (e.g., checksum, digital signature, hash) computed from all or part of the next stage data with an expected value of said integrity datum stored in memory. If the next stage has been modified, the calculated integrity datum will not match the expected value, and the start-up process will fail. If the next stage has not been modified, the branch instruction may be configured to jump to a static address in the next stage, thus transferring control to the next stage (e.g., allowing execution of instructions at that next stage).

However, such processes may not provide sufficient security during start-up. For example, a malicious user may be able to modify the data segment (e.g., insert unauthorized code) from which the integrity datum is computed. In this instance, the integrity datum of the modified segment can be computed and stored into the expected value memory location prior to run time. Thus, upon reaching the branch instruction at run-time, the comparison between the computed (modified) integrity datum and the expected (modified) value will be successful, and the modified code may then be allowed to execute.

Accordingly, embodiments are disclosed herein that relate to a secure start-up process. As described in more detail below the disclosed embodiments may allow for constructing and conducting a secure start-up process comprising a branch instruction in which a target address of the branch instruction is computed from an integrity datum during execution of the branch operation. It will be understood that the term "start-up process" as used herein refers any instruction, or combination of instructions, executed by a computing device upon initialization.

Figure 1:
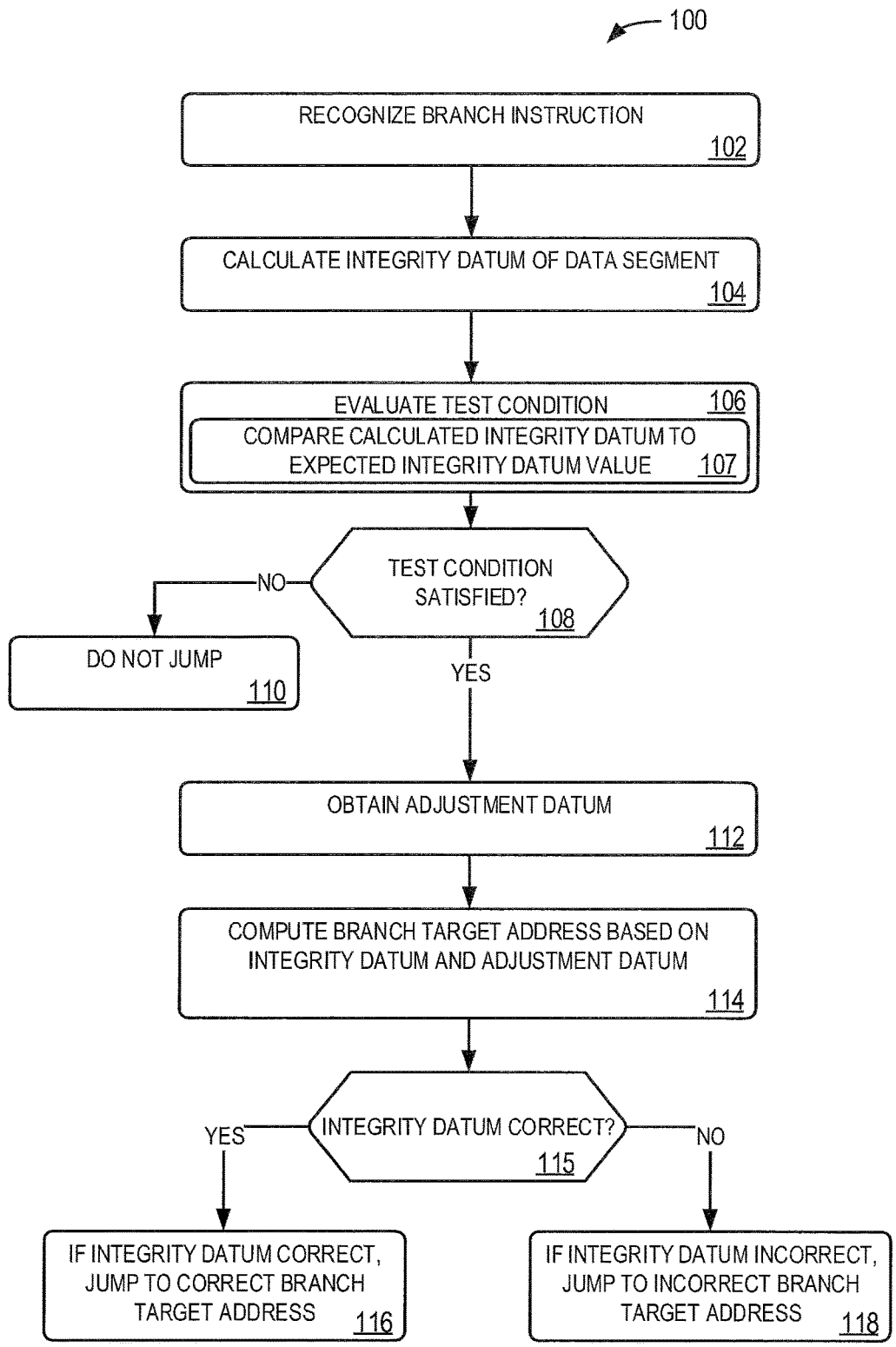
FIG. 1 shows a process flow depicting an embodiment of a method of conducting a secure start-up process comprising a branch instruction.

FIG. 1 shows a process flow depicting an embodiment method 100 for conducting a secure start-up process comprising a branch instruction. At 102, method 100 comprises recognizing a target branch instruction. At 104, method 100 comprises calculating an integrity datum of a data segment, For example, in the case of a multi-stage staff-up process, the data segment may comprise all or part of the next stage. Said integrity datum may be substantially unique to the data segment from which it is computed such that modification of a single bit in the data segment may change the computed integrity datum. Example integrity data include, but are not limited to, checksums, digital signatures, hash functions, and/or a combination thereof.

At 106, method 100 comprises evaluating a test condition of the branch instruction. The test condition may comprise a comparison operator (e.g., less than, greater than equal to) and one or more comparison operands. For example, evaluating the test condition may comprise, at 107, comparing the computed integrity datum to an expected value of the integrity datum. In other embodiments, such as when the branch instruction is a jump instruction, the branch instruction may not include a test condition.

At 108, method 100 comprises evaluating if the test condition is satisfied. If the test condition is not satisfied, method 100 ends without jumping, at 110. On the other hand, if the test condition is satisfied, method 100 continues to 112. At 112, method 100 comprises obtaining an adjustment datum for use in computing the branch target address. It will be understood that the adjustment datum may be stored in any suitable location, including internally or externally to the computing system.

At 114, method 100 comprises computing the branch target address based on the integrity datum and the adjustment datum. Computing may involve one or more operations acting on the integrity datum and/or the adjustment datum. Operations may include, but are not limited to, bit-wise operations (e.g. AND OR, NAND, NOR, XOR, logical shift), mathematical operations (e.g., add, subtract, multiply, divide), and/or a combination thereof.

At 115, if the computed branch target address is correct, method 100 comprises, at 116, jumping to the correct branch target address. Modification to the data segment from which the integrity datum is computed, and/or modification to the stored adjustment datum, may result in the computation of an incorrect branch target address. Accordingly, if the computed branch target address is incorrect, method 100 comprises, at 118, jumping to the incorrect computed branch target address. Such a jump may result in an unknown or unstable computing device state. In other embodiments, such a jump may result in the computing device going into a "locked" mode. In yet other embodiments, upon determining an incorrect computed branch target address, method 100 may comprise not jumping. For example, one or more mechanisms may be configured to detect the incorrect computed branch target address and to halt further code execution (e.g., resulting in a "locked" mode). It will be understood that these scenarios are presented for the purpose of example, and are not intended to be limiting in any manner.

Figure 2:
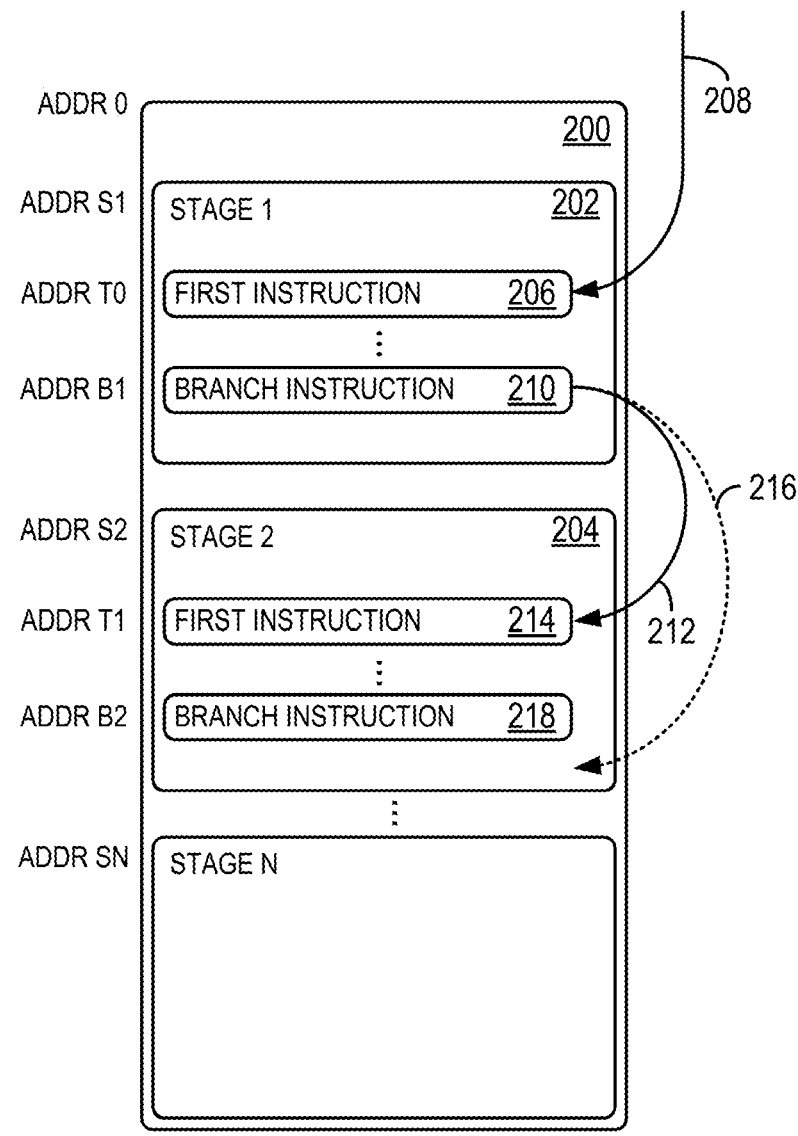
FIG. 2 schematically shows an example embodiment of a memory schematically illustrating a secure start-up process comprising a branch instruction.

As mentioned above, a secure start-up process may involve one or more discrete stages, and each stage may include a branch instruction by which the integrity of the following stage is confirmed before proceeding to said following stage. FIG. 2 schematically shows an example embodiment of a memory 200 for conducting a secure start-up process comprising a branch instruction. Memory 200 comprises a plurality of stages, such as stage 1 202 beginning at address ADDR S1 and stage 2 204 beginning at ADDR S2, up to stage N beginning at ADDR SN.

First instruction 206, located at ADDR T0, may be accessed via an external instruction 208. It will be understood that the term "external instruction" refers to an instruction located externally to memory 200. For example, first instruction 206 may be located at a reset vector that is automatically accessed upon reset of a computing device comprising memory 200, Stage 1 202 further comprises a plurality of instructions, such as branch instruction 210 located at ADDR B1. Upon the test condition of branch instruction 210 being satisfied, branch instruction 210 may be configured to jump to a computed target address. For example, if memory 200 is unmodified, branch instruction 210 may be configured to jump 212 to first instruction 214 of stage 2 204 located at ADDR T1, and the start-up process will execute the instructions beginning at ADDR T1.

However, if memory 200 is modified, branch instruction 210 may be configured to jump 216 to a different, incorrect memory location. For example, as illustrated, branch instruction 210 may jump 216 to a location in stage 2 204 after branch instruction 218. In other instances, the incorrect memory location may be located external to memory 200 and/or may be an invalid address. Said incorrect jump may result in an undefined, unstable, or "locked" system state.

Although first instructions 206 and 214 are illustrated as being offset from the starting address of their respective stage (e.g., stage 1 begins at ADDR S1 while first instruction 206 is located at ADDR T0), it will be understood that such an offset may not exist in other examples. Furthermore, although branch instructions 210 and 218 are illustrated as the last instruction in their respective stages, it will be understood that in some instances, additional instructions may follow. For example, said additional instructions may be included to "lock" the system comprising memory 200 in the event the branch instruction test condition is not satisfied.

Figure 3:
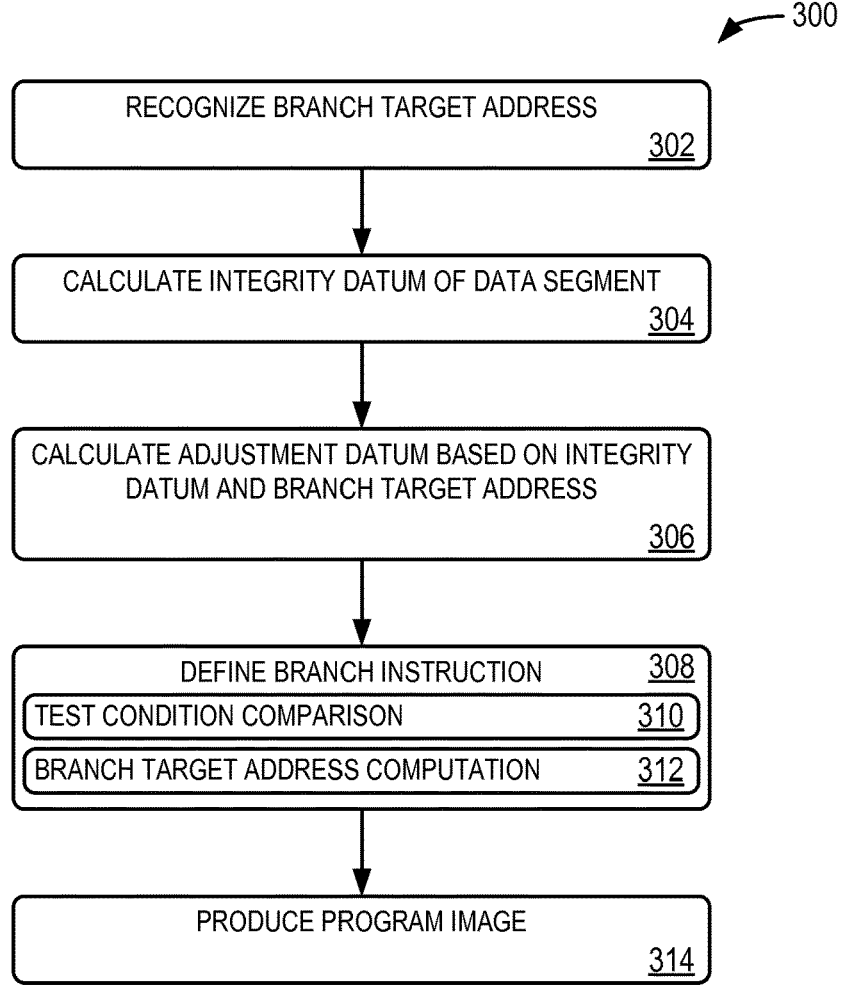
FIG. 3 shows a process flow depicting an embodiment of a method of constructing a secure start-lip process comprising a branch instruction.

A secure start-up process such as that illustrated in FIG. 1 may be constructed in any suitable manner. FIG. 3 shows a process flow depicting an example embodiment of a method 300 for constructing a secure start-up process. At 302, method 300 comprises recognizing a branch target address. The branch target address represents the address that will be computed and subsequently accessed upon satisfaction of a branch instruction test condition. For example, the branch target address may point to a first instruction of a next stage of the secure start-up process. It will be understood that the branch target address may he any static address known during all or part of the construction process, either directly (e.g., pre-defined memory address) or indirectly (e.g., a label defining a location in source code).

At 304, method 300 comprises calculating an integrity datum of a data segment. As mentioned above, example integrity data may include, but are not limited to, checksums, digital signatures, hash functions, or a combination thereof. Furthermore, the integrity datum may be substantially unique to the data segment such that modification of a single bit in the data segment may effect change in the integrity datum.

At 306, method 300 comprises calculating an adjustment datum based on the integrity datum and the branch target address. Said calculation may utilize one or more reversible algorithms such that known values (e.g., integrity datum and branch target address) may be used to compute the unknown value (e.g., adjustment datum). Said algorithms may include one or more bit-wise operations, one or more mathematical operations, and/or a combination thereof.

At 308, method 300 comprises defining a branch instruction. The branch instruction may be configured to alter the control flow based on a test condition comparison 310. Comparison 310 may comprise one or more comparison values and a comparison operator (e.g., less than, greater than, equal to) operating on the one or more comparison operands. In sonic embodiments, such as when the branch instruction is a jump instruction, the branch instruction may not include comparison 310. The branch instruction may further include a branch target address computation 312. Computation 312 may utilize, for example, the reverse of the algorithm used at 306 to compute the adjustment datum.

At 314, method 300 comprises producing a program image. It will be understood that "producing" may comprise one or more mechanisms resulting in one or more instructions, defined in a target ISA or HDE, for conducting a secure start-up process (e.g., method 100 of FIG. 1). Such mechanisms may include, but are not limited to, compiling, translating, optimizing, and combinations thereof.

The above described methods and processes may be tied to a computing system including one or more computers, in particular, the methods and processes described herein may be implemented as a computer application, computer service, computer API, computer library, and/or other computer program product.

Figure 4:
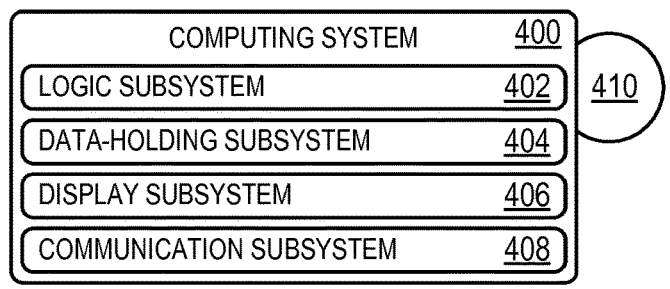
FIG. 4 schematically shows an example embodiment of a computing device.

FIG. 4 schematically shows a nonlimiting computing system 400 that may perform one or more of the above described methods and processes. Computing system 400 is shown in simplified form, it is to be understood that virtually any computer architecture may be used without departing from the scope of this disclosure. In different embodiments, computing system 400 may take the form of a mainframe computer, server computer, desktop computer, laptop computer, tablet computer, home entertainment computer, network computing device, mobile computing device, mobile communication device, gaming device, etc.

Computing system 400 includes a logic subsystem 402 and a data-holding subsystem 404. Computing system 400 may optionally include a display subsystem 406, communication subsystem 408, and/or other components not shown in FIG. 4. Computing system 400 may also optionally include user input devices such as keyboards, mice, game controllers, cameras, microphones, and/or touch screens, for example.

Logic subsystem 402 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 404 may include one or more physical, non-transitory, devices configured to hold data and/or instructions executable by the logic subsystem to implement the herein described methods and processes. When such methods and processes are implemented, the state of data-holding subsystem 404 may be transformed (e.g., to hold different data).

Data-holding subsystem 404 may include removable media and/or built-in devices. Data-holding subsystem 404 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 404 may include devices with one or more of the following characteristics: volatile, nonvolatile, dynamic, static, read/write, read-only, random access, sequential access, location addressable, file addressable, and content addressable. In some embodiments, logic subsystem 402 and data-holding subsystem 404 may be integrated into one or more common devices, such as an application specific integrated circuit or a system on a chip.

FIG. 4 also shows an aspect of the data-holding subsystem in the form of removable computer-readable storage media 410, which may be used to store and/or transfer data and/or instructions executable to implement the herein described methods and processes. Removable computer-readable storage media 410 may take the form of CDs, DVDs, HD-DVDs, Blu-Ray Discs, EEPROMs, and/or floppy disks, among others.

It is to be appreciated that data-holding subsystem 404 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 406 may be used to present a visual representation of data held by data-holding subsystem 404. As the herein described methods and processes change the data held by the data-holding subsystem, and thus transform the state of the data-holding subsystem, the state of display subsystem 406 may likewise be transformed to visually represent changes in the underlying data. Display subsystem 406 may include one or more display devices utilizing virtually any type of technology. Such display devices may be combined with logic subsystem 402 and/or data-holding subsystem 404 in a shared enclosure, or such display devices may be peripheral display devices.

When included, communication subsystem 408 may be configured to communicatively couple computing system 408 with one or more other computing devices. Communication subsystem 408 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 400 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of conducting a secure start-up process, the secure start-up process comprising a branch instruction, the method comprising:
   recognizing the branch instruction;
   in response to recognizing the branch instruction, calculating an integrity datum, the integrity datum being calculated from a data segment, the integrity datum being unique to the data segment such that modification of the data segment would change the integrity datum that is calculated;
   obtaining an adjustment datum previously derived from an expected value of the integrity datum and a correct branch target address;
   computing a branch target address by one or more operations acting on the integrity datum and the adjustment datum such that the correct branch target address is computed when the data segment has not been modified and an incorrect branch target address is computed when the data segment has been modified;

jumping to the correct branch target address when the correct branch target address is computed based upon the data segment not having been modified; and jumping to the incorrect branch target address when the incorrect branch target address is computed based upon the data segment having been modified.

2. The method of claim 1, wherein the integrity datum comprises a hash value.

3. The method of claim 1, wherein the integrity datum comprises a checksum.

4. The method of claim 1, wherein the integrity datum comprises a digital signature.

5. The method of claim 1, wherein the branch instruction comprises a test condition, the test condition comprising a comparison operator operating on comparison values.

6. The method of claim 5, wherein the test condition comprises a comparison between the integrity datum that was calculated and the expected value of the integrity datum.

7. A computing device configured to provide a secure start-up process comprising a plurality of start-up stages, the secure start-up process comprising a branch instruction, the branch instruction comprising a test condition, the computing device comprising:
    a processor; and
    a memory comprising instructions stored thereon that are executable by the processor to:
        in an earlier start-up stage, recognize the branch instruction;
        in response, calculate an integrity datum, the integrity datum being calculated from a data segment, the integrity datum being unique to the data segment such that modification of the data segment would change the integrity datum that is calculated;
        obtain an adjustment datum previously derived from an expected value of an integrity datum and a correct branch target address;
        evaluate the test condition, the test condition comprising a comparison between the integrity datum that was calculated and the expected value of the integrity datum;
        when the test condition is satisfied, then calculate a branch target address by one or more operations acting on the integrity datum and the adjustment datum such that the correct branch target address is calculated when the data segment has not been modified and an incorrect branch target address is calculated when the data segment has been modified, the branch target address corresponding to a later start-up stage performed after the earlier start-up stage;
        jump to the correct branch target address when the correct branch target address is calculated based upon the data segment not having been modified; and
        jump to the incorrect branch target address when the incorrect branch target address is calculated based upon the data segment having been modified.

8. The computing device of claim 7, wherein the integrity datum comprises a hash value.

9. The computing device of claim 7, wherein the integrity datum comprises a checksum.

10. The computing device of claim 7, wherein the integrity datum comprises a digital signature.

11. The computing device of claim 7, wherein the data segment comprises data representing instructions of all or part of the later start-up stage.

12. A non-transitory computer readable storage device comprising computer readable instructions for conducting a secure start-up process, the secure start-up process comprising a branch instruction, the computer readable instructions being executable by a computing device to:
    recognize the branch instruction;
    in response to recognizing the branch instruction, calculate an integrity datum, the integrity datum being calculated from a data segment, the integrity datum being unique to the data segment such that modification of the data segment would change the integrity datum that is calculated;
    obtain an adjustment datum previously derived from an expected value of the integrity datum and a correct branch target address;
    compute a branch target address by one or more operations acting on the integrity datum and the adjustment datum such that the correct branch target address is computed when the data segment has not been modified and an incorrect branch target address is computed when the data segment has been modified;
    jump to the correct branch target address when the correct branch target address is computed based upon the data segment not having been modified; and
    jump to the incorrect branch target address when the incorrect branch target address is computed based upon the data segment having been modified.

13. The non-transitory computer readable storage device of claim 12, wherein the integrity datum comprises a hash value.

14. The non-transitory computer readable storage device of claim 12, wherein the integrity datum comprises a checksum.

15. The non-transitory computer readable storage device of claim 12, wherein the integrity datum comprises a digital signature.

16. The non-transitory computer readable storage device of claim 12, wherein the branch instruction comprises a test condition, the test condition comprising a comparison operator operating on comparison values.

17. The non-transitory computer readable storage device of claim 16, wherein the instructions are further executable to evaluate the test condition, and when the test condition is satisfied, then compute the branch target address.

18. The non-transitory computer readable storage device of claim 16, wherein the test condition comprises a comparison between the integrity datum that was calculated and the expected value of the integrity datum.

19. The non-transitory computer readable storage device of claim 12, wherein the instructions are executable to recognize the branch instruction in an earlier start-up stage, and wherein the branch target address corresponds to a later start-up stage performed after the earlier start-up stage.

20. The non-transitory computer readable storage device of claim 19, wherein the data segment comprises data representing instructions of all or part of the later start-up stage.

* * * * *